Sept. 7, 1965 L. E. FRANK ETAL 3,205,469

PIN BOARD

Filed July 12. 1961 3 Sheets-Sheet 1

INVENTORS
CLARENCE S. JONES
LORANT E. FRANK
ABE KLEIN
BY Edward A. Robinson
ATTORNEY Sept. 7, 1965 L. E. FRANK ETAL 3,205,469

PIN BOARD

Filed July 12, 1961 3 Sheets-Sheet 2

INVENTORS
CLARENCE S. JONES
LORANT E. FRANK
ABE KLEIN
BY Edward A. Robinson
ATTORNEY

PIN BOARD

INVENTORS

CLARENCE S. JONES
LORANT E. FRANK
ABE KLEIN

BY Edward A. Robinson
ATTORNEY 3,205,469

PIN BOARD

Lorant E. Frank and Abe Klein, Palo Alto, and Clarence S. Jones, Los Altos, Calif., assignors to General Precision, Inc., Binghamton, N.Y., a corporation of Delaware Filed July 12, 1961, Ser. No. 123,478
2 Claims. (Cl. 339—18)

This invention relates to electrical switching apparatus, and more particularly, this invention relates to a pin board wherein electrical circuits may be selectively connected to program inputs to an electronic computer or the like.

Electronic computers may receive program information or inputs by the selective closure of one circuit upon another by several means. One arrangement may provide switches which may be keyed manually to enter program information into the computer. Another computer input means may utilize a patchboard arrangement wherein electrical connections are made semipermanently by jumpers or short conductors selectively connecting between various terminals, jacks or the like. Yet, another arrangement may use a pin board having parallel conductive elements sandwiched in layers such that the conductors of one layer are perpendicular with respect to the conductors of another layer whereby connections may be made between selected conductors of the two layers by inserting metallic or electrically conductive plugs or pins into a matrix intersection to cause an electric connection between the conductors of the respective layers which pass through that intersection.

Many computers are used to solve similar problems involving the same steps or program, and in these cases a keyboard controlled input or a patchboard input has proven satisfactory. However, a computer which is to be used for many varied problems may require a new programming set-up for each different application, and a pin board arrangement has been found to be most successful in such cases. A pin board arrangement for making selective connections is advantageous over a patchboard arrangement having jumpers selectively connected between various terminals, because of the ease of determining the connections to be made and the ease of checking connections already existing. In a normal computer, set-up with a patchboard, the jumper leads making the many electrical connections required may present a somewhat confusing maze of electrical leads to a programmer who may wish to check existing connections or to modify connections which have been previously made. On the other hand, a plug board arrangement may be checked or altered with comparative ease since each of the electrical connections lies at a matrix intersection that is readily identifiable with the circuits and conductors leading to that intersection.

It is an object of this invention to provide an improved pin board using printed circuit techniques for manufacture of component layers with conductive strips on backing sheets of plastic fiber glass or the like, and further providing a matrix arrangement of conductive strips such that pins or plugs may be inserted through holes in the sheets at matrix intersections to make electrical connections between selected ones of the conductive strips.

Another object of this invention is to provide an improved pin broad wherein eyelets are formed through holes of printed circuit boards to provide electrical connection points at matrix intersections between conductors, and to further provide an improved plug arrangement having opposed spaced strips of resilient material forming shank portions of the plug and adapted to contact and be compressed inwardly by the eyelets into which the plug is inserted.

A further object is to provide an improved pin board having eyelet connectors which are formed in oval shapes each having a short and a long diameter such that a pin or plug inserted therein will be compressed and deformed across the short diameter to insure a good electrical contact with the eyelet.

Numerous other objects and advantages will be apparent throughout the progress of the specification which follows. The accompanying drawings illustrate a certain selected embodiment of the invention and the views therein are as follows.

Figures 2, 4:
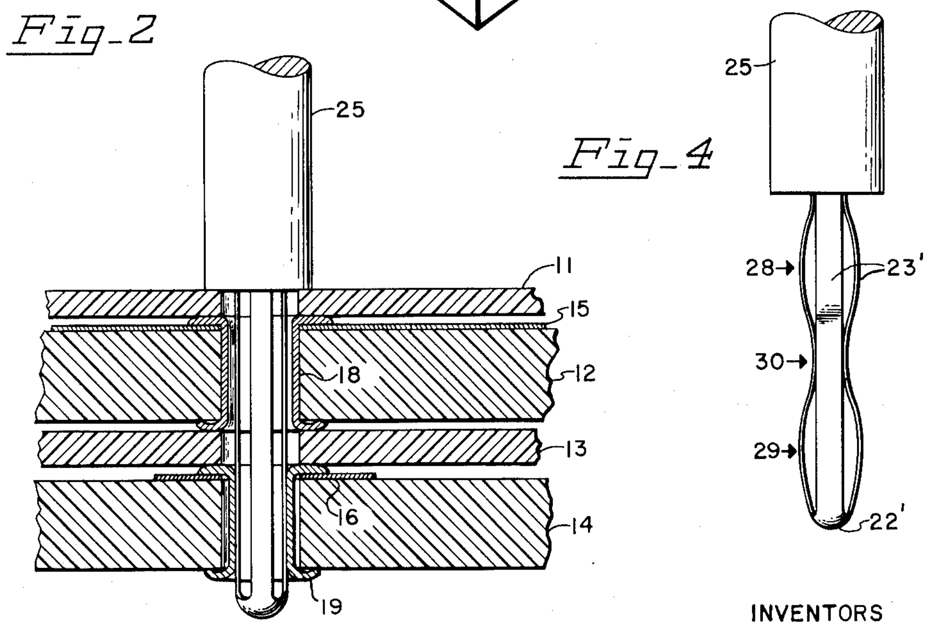
FIGURE 2 is an enlarged sectional view of fragmentary portions of the pin board of this invention illustrating the manner in which a pin may be inserted through the board to make an electric connection between selective eyelets and conductive strips in two component layers of the pin board.
Figure 3A:
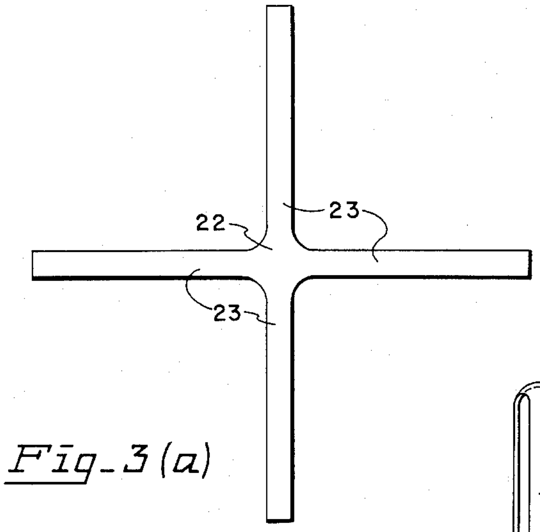
Figure 3B:
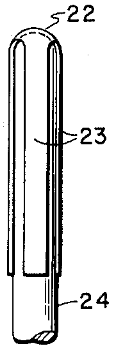
Figure 3C:
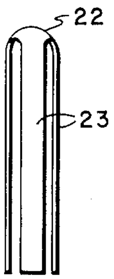
Figure 3D:
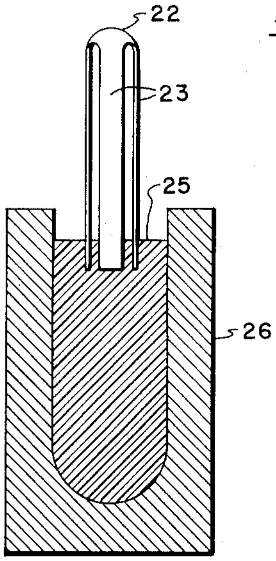
Figure 3E:
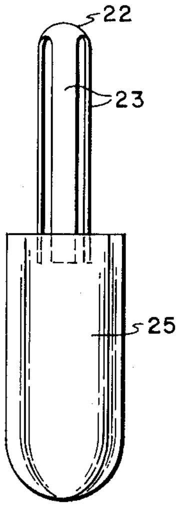
Figure 6:
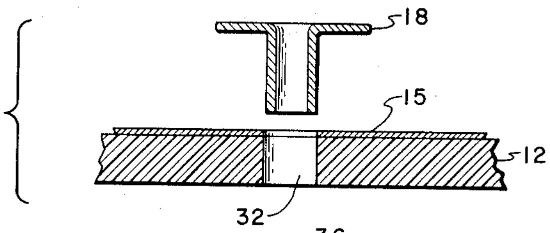
Figure 6:
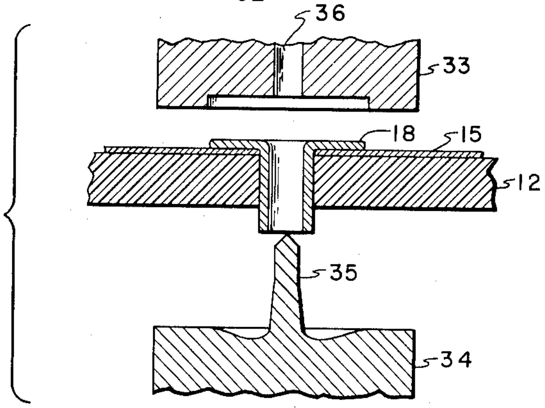
Figure 6:
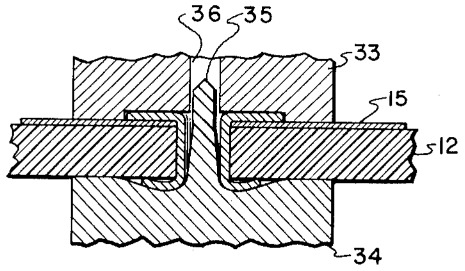
Figure 5:
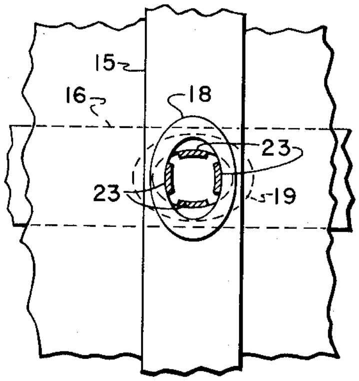
Figure 6:
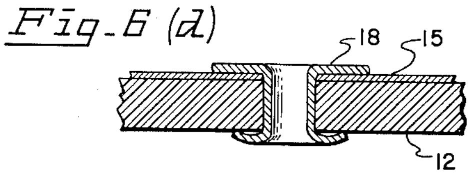

FIGURES 3(*a*) through 3(*e*) illustrate a method for assembling an electrically conductive pin or plug which may be used with the pin board of this invention;

FIGURE 4 illustrates an alternative form of a plug or pin for this invention;

FIGURE 5 is an enlarged view of a fragmentary portion of the pin board of this invention illustrating the shape and arrangement of the eyelets constituting electric connectors with conductive strips on the layers; and FIGURES 6(*a*) through 6(*b*) illustrate a method for mounting and forming an eyelet connector on a component layer of the pin board.

Briefly stated, according to this invention, a pin board comprises a sandwich arrangement of several component layers 11, 12, 13 and 14 (see FIGURE 1) wherein the layer 12 is a printed circuit board having a plurality of parallel conductive strips 15 bonded thereto, and the component layer 14 is a similar printed circuit board having a plurality of parallel electrically conductive strips 16 extending at right angles to the conductors 15 of the board 12. When the pin board is assembled, the conductive strips 15 and 16 will form a matrix and appropriate holes are provided through all of the component layers at the matrix intersections which are defined by the cross over areas of the conductors 15 with respect to the conductors 16. Oval eyelets are mounted on the conductors 15 and 16 at the matrix intersections such that a pin may be inserted through a selective hole in the board to make electrical contact between an eyelet in a selected one of the strips 15 and another eyelet in another selected one of the strips 16. The eyelets are formed in an oval shape with a shortened diameter to compress and deform the pin extending therethrough to insure proper electrical contact. The eyelets through the strips 16 may be oriented perpendicularly with respect to the eyelets in the strips 15 such that different sides of the plugs are separately deformed and compressed along two axes thereof.

Figure 1:
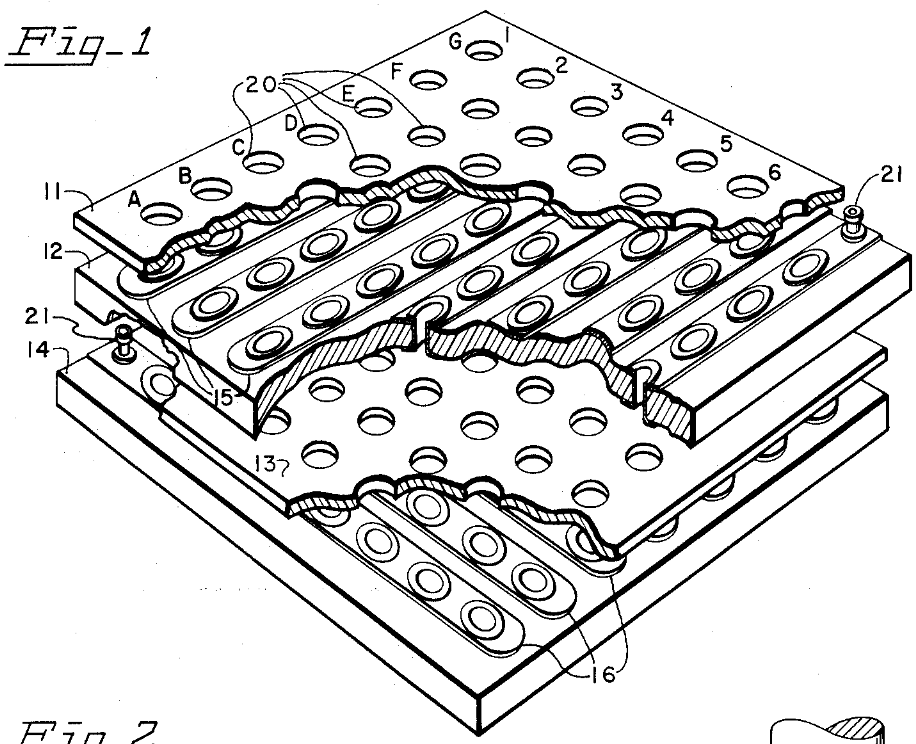
FIGURE 1 is an exploded view of a pin board constructed in accordance with the teachings of this invention wherein the various component layers of the pin board are shown in perspective and wherein some of the layers are broken away to expose the structure of the underlying layers.

As shown in FIGURES 1 and 2, the layers 11, 12, 13 and 14 comprise the pin board and include two printed circuit boards 12 and 14 with conductive strips 15 and 16 bonded thereto and two further layers 11 and 13 which provide spacing or separation preventing direct contact between an eyelet 18 of the layer 12 and a further eyelet 19 of the layer 14. The top cover layer 11 effectively protects the face of the pin board such that none of the conductive strips 15 are directly exposed. The layer 11 may be of plastic material having indicia printed thereon which may identify the various holes 20 with the conductors which form the matrix intersection.

Such identifying indicia may merely identify the rows and columns as indicated in FIGURE 1 by means such as alphabetical and/or numerical designations. By this means a programmer may selectively insert pins into the matrix intersections to close circuits one upon another. As shown in FIGURE 1, a terminal connector 21 may be provided connecting with each of the conductive strips 15 and 16 to provide a means for connecting an insulated wire or other electrical conductor thereto. The component layers 12 and 14 may extend slightly beyond the other component layers along two respective sides of the pin board (shown as the rear sides in FIGURE 1) to provide spacing for the connectors 21 to be mounted thereon.

The pins or electric plugs may be of a type shown in FIGURE 3(*e*). Each plug may be assembled from a metal stamping formed as a cross shown in FIGURE 3(*a*) having a hub portion 22 and four radially extending strips 23. This metal stamping may be formed about elongated die 24 as shown in FIGURE 3(*b*). The end of the die is rounded such that the hub portion 22 is formed into a rounded end of the plug while the strips 23 are formed as four sides around the die 24. The die 24 may thence be removed as shown in FIGURE 3(*c*) and the metallic portion of the plug and legs 23 may be inserted into a plastic material such as an epoxy resin 25. The epoxy resin or other plastic material 25 may be poured into a mold 26, and after insertion of the metallic parts 23 the plastic is hardened and becomes rigid by the application of heat or other means known in the chemical arts. After the plastic 25 has hardened the mold 26 may be removed and the plug of FIGURE 3(*e*) is complete. Thus, in its final state, the plug or pin includes a rounded end 33, two pairs of opposed spaced sides formed from the strips 23 and a handle of the resin 25. Prior to the insertion into the plastic handle 25, the metallic part of the plug 22–23 may be heat treated such that the final plug is resilient and capable of deformation when inserted into the pin board, and being capable of springing back to its original shape upon removal from the pin board.

FIGURE 4 illustrates an alternative form of a pin or plug similar to that shown by FIGURE 3(*e*). In the case of FIGURE 4 the metallic portion 22′–23′ is formed about a die similar to 24 of FIGURE 3(*b*) but having two lobes of enlarged diameter separated by a neck portion of reduced diameter. Thus, the plug of FIGURE 4 is formed to have two enlarged lobes 28 and 29 which are separated by a neck 30 of reduced dimension.

As shown by FIGURE 5, the eyelets 18 and 19 electrically connecting two conductive strips 15 and 16 of the two printed circuit boards at a matrix intersection point, are oval in shape and are oriented perpendicularly to each other. Thus, the eyelets 18 and 19 each having a long diameter and a short diameter but the orientation is such that the short diameter of the eyelet 19 corresponds with the long diameter of the eyelet 18 while the short diameter of the eyelet 18 extends parallel to the long diameter of the eyelet 19. When an electrical pin of the type shown by FIGURE 3(*e*) is inserted into the matrix intersection of FIGURE 5, one opposed spaced pair of metallic strips 23 is compressed together by the short diameter of one of the eyelets while the other opposed spaced pair of conductive strips is deformed and compressed together by the short diameter of the other eyelet. Therefore, each of the eyelets 18 and 19 will make a good contact with at least one pair of opposed spaced sides of the pin which are deformed thereby, and since the metal parts 22–23 of the pin are unitary in character having been formed from the same sheet of material (FIGURE 3(*a*)), a good electric connection will be made between the two eyelets 18 and 19.

The plug of FIGURE 4 may be inserted into the eyelets at a selected matrix intersection, whereupon each of the enlarged lobes will contact a separate eyelet and a deformation of one of the lobes will not impair a good electrical contact between the opposite lobe and the corresponding eyelet. Thus, it will be appreciated that the two lobes 28 and 29 of the pin of FIGURE 4 may be deformed independently of each other and each will make a proper contact with the respective eyelets into which it is inserted, and the eyelets need not have a particular shape or orientation.

The eyelet connectors may be inserted and formed into a hole in a printed circuit board as shown in FIGURES 6(*a*) through 6(*d*). The initial step shown in FIGURE 6(*a*), is accomplished when an eyelet 18 having but one enlarged end is inserted through a hole 32 of the circuit board 12. The circuit board 12 may be of plastic, fiber glass, or any other electric insulating material upon which the conductive strip 15 has been bonded, and the hole 32 extends through both the insulating material 12 and the conductive strip 15.

The eyelet 18 is inserted and seated into the hole 32, and a pair of dies 33 and 34 are brought together upon the eyelet 18 as shown in FIGURE 6(*b*). In FIGURE 6(*c*), the dies 33 and 34 have rolled the lower shank of the eyelet 18 back upon the circuit board 12 forming a flange such that the eyelet is mounted firmly in the board. As shown in FIGURE 6(*d*), the eyelet 18 remains fixed through the hole in the circuit board 12 after the dies have been removed. In a subsequent step the circuit board 12 with the eyelets 18 thereon may be dipped into a solder bath (not shown) in accordance with printed circuit techniques and the electrically conductive strip 15 and the eyelet 18 will be permanently bonded together with solder to form a good electric connection.

The forming of an oval eyelet as shown in FIGURES 1 and 5 may be accomplished by properly shaping the dies 33 and 34. The die 34 is shown to have a forwardly extending finger 35 which protrudes through the eyelet 18 and into a mating hole 36 in the die 33. The protruding finger 35 assures a correct alignment of the dies 33 and 34 and may have an oval shape with a long diameter and a short diameter to cause the eyelet 18 to stretch in one direction more than the other as the flange is rolled such that the final form of the mounted eyelet will be an ellipse or oval.

An advantage of this invention lies in the fact that the eyelets and plugs used may be miniaturized and reduced in size together with the conductive strips which are formed by printed circuit techniques. Thus, for a given size or area the number of matrix intersection points may be increased to a maximum by reducing the size of the eyelets and pins. Indeed, it is contemplated that the matrix intersections of a pin board constructed in accordance with this invention may be spaced 0.125 inch apart from each other such that a single square inch of pin board area may include 64 matrix intersections.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A pin board comprising two printed circuit boards each having parallel electrically conductive strips thereon, said boards being in spaced relation with each other such that the conductive strips of one of the boards extend perpendicularly to the conductive strip of the other board forming a rectangular matrix, each printed circuit board having a plurality of eyelets therein mounted through holes in the board at points in the matrix corresponding to intersections of the conductive strips, each of the eyelets being formed in an oval having a long diameter and a short diameter, and an electric plug adapted for insertion through corresponding eyelets in both boards to make electric contact between selected ones of the conductive strips on each board, said plug being formed from a metallic sheet having a plurality of elongated strips extending from a central hub, said strips being formed into pairs of opposed spaced conductive sides, a first pair of opposed spaced sides making contact with a first eyelet and being compressed by the short diameter thereof and a second pair of opposed spaced sides making contact with a second eyelet and being compressed by the short diameter thereon.

2. A pin board comprising two printed circuit boards each having parallel electrically conductive strips thereon, said boards being in spaced relation with each other such that the conductive strips of one of the boards extend perpendicularly to the conductive strip of the other board forming a rectangular matrix, each printed circuit board having a plurality of eyelets therein mounted through holes in the board at points in the matrix corresponding to intersections of the conductive strips, each of the eyelets being formed in an oval having a long diameter and a short diameter, said eyelets being formed on the printed circuit boards with the long diameter extending in the direction of the conductive strip with which the eyelet makes electrical contact whereby the eyelets of one of the printed circuit boards will be oriented perpendicular to the eyelets in the other printed circuit board with respect to the long diameters thereof and an electric plug adapted for insertion through corresponding eyelets in both boards to make electric contact between selected ones of the conductive strips on each board, said plug being dimensioned to be compressed and deformed along the short diameter of the eyelets into which the plug is inserted.

References Cited by the Examiner

UNITED STATES PATENTS

| | | | |
|---|---|---|---|
| 840,537 | 1/07 | Weir | 339—18 X |
| 2,064,545 | 12/36 | Kleinmann et al. | 339—252 |
| 2,398,684 | 4/46 | Woodward | 339—252 |
| 2,599,710 | 6/52 | Hathaway | 339—17 X |
| 2,756,485 | 7/56 | Abramson et al. | 339—17 |
| 2,958,064 | 10/60 | Swengel | 339—17 |
| 2,967,285 | 1/61 | Freitas | 339—18 |
| 3,028,573 | 4/62 | Stoehr | 339—17 |

FOREIGN PATENTS

| | | |
|---|---|---|
| 70,102 | 10/58 | France. |
| 1,125,123 | 7/56 | France. |
| 1,228,476 | 3/60 | France. |

JOSEPH D. SEERS, *Primary Examiner.*

PATRICK A. CLIFFORD, *Examiner.*